United States Patent Office 3,527,949
Patented Sept. 8, 1970

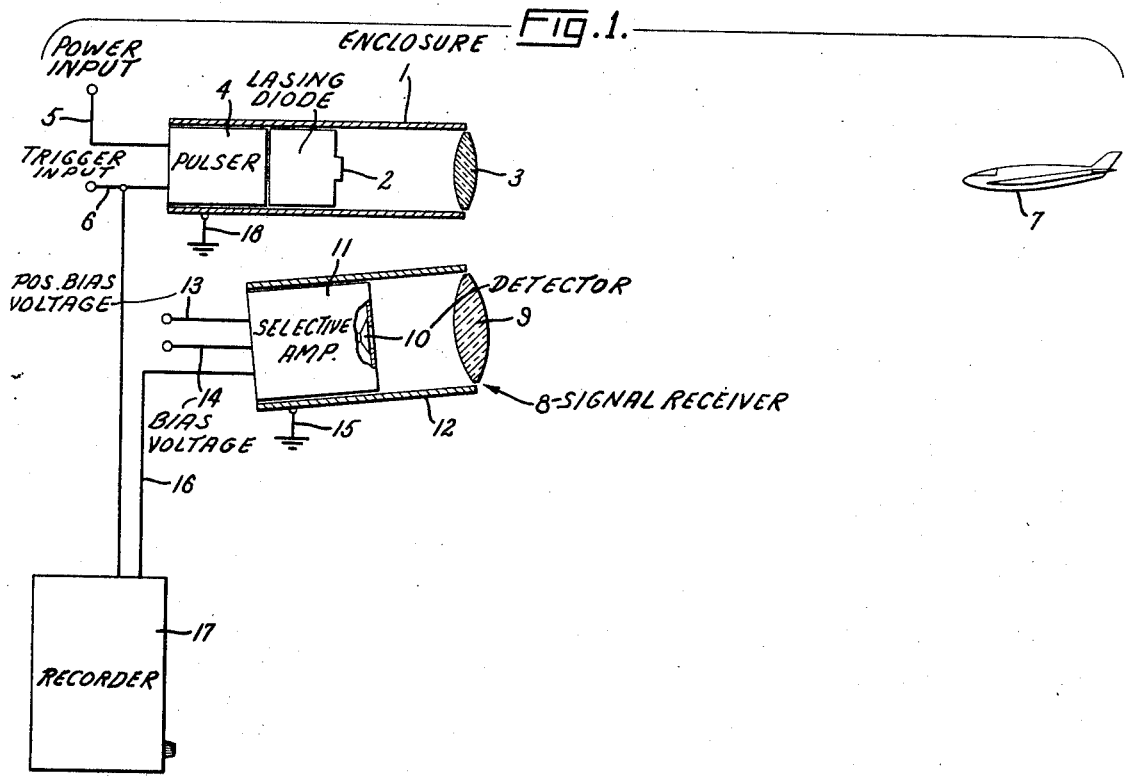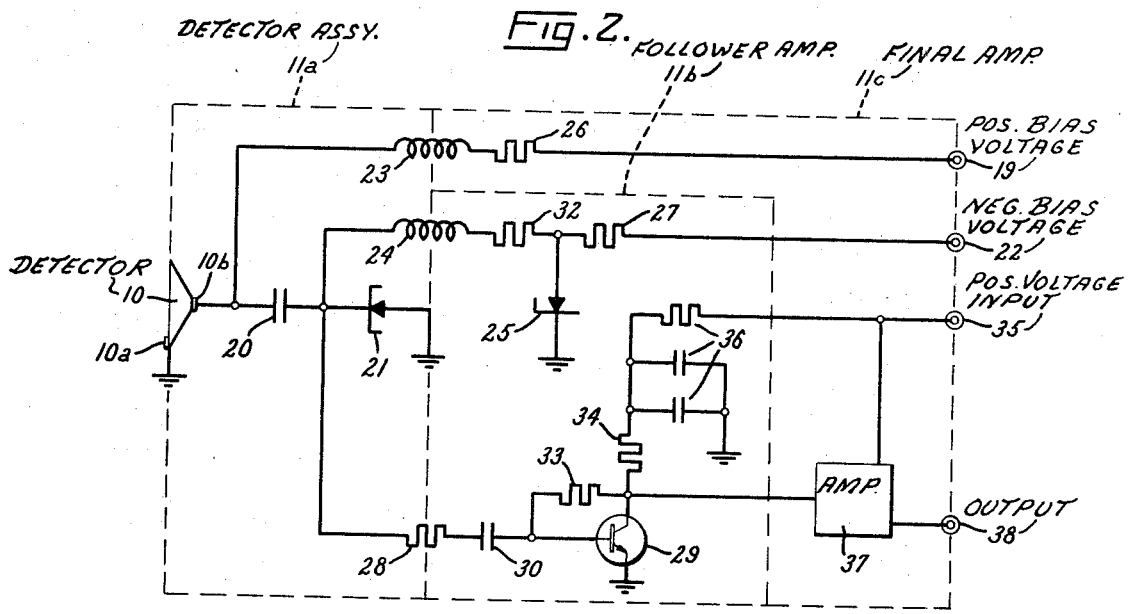

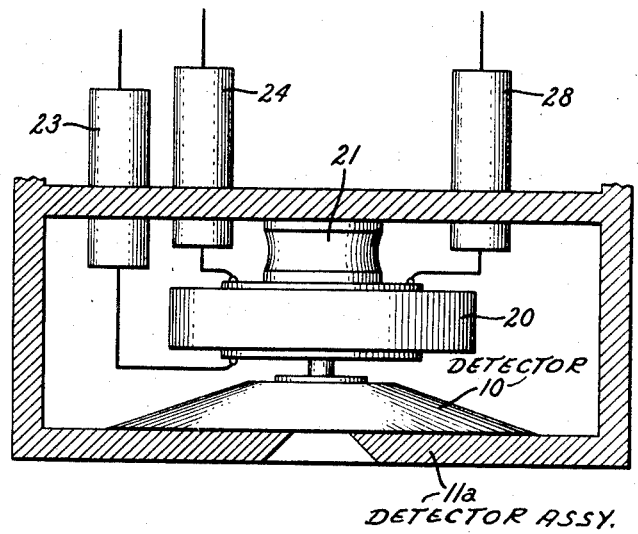
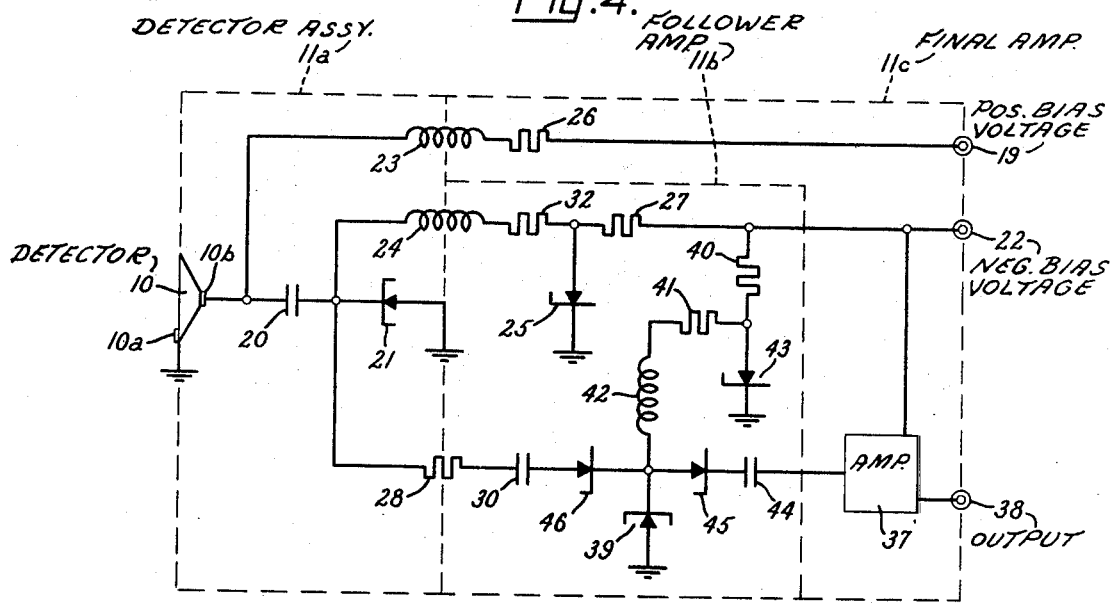

3,527,949
LOW ENERGY, INTERFERENCE-FREE, PULSED SIGNAL TRANSMITTING AND RECEIVING DEVICE
Gerald C. Huth, Rosemont, and Robert J. Locker, King of Prussia, Pa., assignors to General Electric Company, a corporation of New York
Filed Feb. 15, 1967, Ser. No. 616,314
Int. Cl. H04b 9/00
U.S. Cl. 250—199                                    10 Claims

ABSTRACT OF THE DISCLOSURE

A rapid rise time, low energy, visible and near infrared pulse signal transmitter, such as a pulsed gallium arsenide injection lasing diode, is combined with a highly sensitive, digitally responsive receiver, such as a contoured, avalanche amplifying, silicon, semiconductor detector and a tunnel diode system for selectively amplifying rapid rise time pulses only, to provide an interference-free, ranging, signalling, or point-to-point communication device.

INTRODUCTION

This invention relates to an electronic signal transmitting and receiving device. Specifically, it relates to miniaturized ranging and communicating devices which utilize pulsed signals in the visible-near infrared range and which are not affected by ordinary artificial or natural light.

BACKGROUND

Heretofore, such devices have employed pulsed radiant energy signals of relatively high energy and long wavelength (generally in the "microwave" region). As a result, the transmitters have required rather high power input, and power supplying and signal transmitting equipment has been large and complex. On the receiving end, the equipment has also been large and complex in order to receive the reflected signal and to discriminate between it and other incident energy signals. These devices therefore have occupied a fairly large amount of space. Further, their size and complexity have been a handicap to their accuracy and reliability. In particular, the many components and component connections in these prior art devices all introduced possible error and time lag, which interfered with the accurate measurement of the time delay between a signal's transmission and its reception. This, in turn, has rendered accurate ranging at short distances practically impossible.

Recent technological advances in this and related arts have produced many sophisticated, efficient signal generators and receivers, which are highly miniaturized and refined with respect to sensitivity and to deviation in signal energy and frequency. Nevertheless, there have been only limited application of these improved components particularly in the art relating to ranging devices; no one has been able to produce a suitable combination of these components as is required for a practical, accurate miniaturized ranging system.

Efforts to develop short wavelength signalling and ranging systems, in which the signal wavelength approaches that of the visible spectrum, have been frustrated by certain specific problems. For example, signal energy in the visible or near visible part of the spectrum must be minimized to avoid inadvertent eye damage as well as to minimize the size and complexity of the signal generator and its associated power supply. A further problem is that natural and artificial light produce interfering signals which must be discriminately eliminated in any practical visible wavelength ranging system; and the selective detection of the signal should be done without dissipating the signal since it preferably is of very low energy to begin with.

OBJECTS

With a view to these problems it is therefore an object of the present invention to provide a miniaturized device for transmitting and selectively receiving pulsed low energy signals in the visible near-infrared range.

Another object of this invention is to provide a practical, safe, interference-free ranging, communication, or signaling system.

Still another, and more specific, object of this invention is to provide a suitable combination of miniaturized components capable of determining distance to a reflecting target, even at short range, with a high degree of accuracy through the sending and receiving of low energy signals.

BRIEF SUMMARY OF THE INVENTION

These and other objects are met, in accordance with the present invention, by a system comprising a means, such as a pulsed injection lasing diode, for transmitting a series of coherent, short wavelength signals, each signal having a very rapid rise time to an energy level of at least several watts, and means for selectively receiving reflections of these signals. The latter includes a low capacitance, semiconductor detector, which is highly sensitive to short wavelength signals and which is contoured and biased to produce avalanche amplification of a detected signal, along with a circuit, having a high impedance for rapid rise time pulses and a low impedance for slow time pulses, for bleeding off any slow rise time signals collected by the detector, a tunnel diode coupled to the detector so that rapid rise time signals in the detector are amplified by the tunnel diode, and a relatively high impedance signal transmitting circuit.

DETAILED DESCRIPTION OF THE INVENTION

While the specification concludes with claims particularly pointing out and distinctly claiming the subject matter of the present invention, it may be better understood from the following description, taken in conjunction with the following drawings, in which:

FIG. 1 is a conceptual illustration of one form of the present invention;

FIG. 2 is a circuit diagram of one form of the signal receiver used in the present invention;

FIG. 3 illustrates the physical lay-out of the primary components of the receiver circuit diagrammed in FIG. 2; and FIG. 4 is a circuit diagram of another form of signal receiver.

Referring more specifically to FIG. 1, there is shown a conceptual view, partially in cross-section, of a ranging device comprising an enclosure 1, housing a semiconductor injection lasing diode 2, capable of emitting rapid rise time, coherent signals in the visible near-infrared range, an optical focusing means, i.e., a lens 3, a pulsing means 4, capable of generating rapid rise time laser pulses and a power input circuit 5 connected to power supply means, not shown. Laser pulsing means 4 is controlled through circuit 6 by a trigger pulse generator, not shown. The trigger pulse generator means may comprise any controllable source of low current pulses, with a frequency over 10 pulses per second. Laser pulsing means 4 is an electronic switching circuit, which in response to a trigger pulse, sends a high current surge to the lasing diode 2. This assembly is connected, through enclosure 1, to a grounding connection 18.

Preferably, lasting diode 2, is one which is capable of controlled pulsed operation at room temperature and which operates on relatively low power to emit visible or near infrared coherent signals having a rise time of substantially less than 200 nanoseconds. One such lasing diode is fabricated from gallium arsenide and is capable of emitting pulsed coherent signals in the 0.9 micron range at room temperature. It is commercially available, as the H1D1 Injection Lasing Diode, from the General Electric Company, Semiconductor Products Department, Syracuse, N.Y. This diode is powered from a current pulser of 200 ampere capability with a pulse repetition rate of from 100 to 500 pulses per second. Optical output signal energies from 1 to 25 watts result. It has a signal rise time to several watts of less than 20 nanoseconds.

Also shown in FIG. 1 is a reflecting, not necessarily cooperatively reflecting, target 7 and a signal receiver 8, comprised of signal focusing means 9, a short wavelength signal detector 10 contoured and biased to produce avalanche amplification therein and a means 11 for selectively amplifying and transmitting rapid rise time signals received by the contoured detector 10. The signal receiver also includes housing 12, means 13 for applying a high positive voltage bias to the detector 10, means 14 for applying other bias voltages required in the signal receiving means 11, a ground connection means 15 and an output circuit 16, which is connected along with the trigger pulse circuit 6, to a ranging indicator or recorder 17. Generally, recorder 17 is a high speed oscilloscope, preferably one capable of resolving pulse pairs with a 10 nanosecond separation.

A simplified circuit diagram of one form of signal receiver used in the present invention is shown in FIG. 2. The circuitry shown in FIG. 2 is physically located in a compartmentalized housing, indicated schematically in FIG. 2, which includes a detector compartment 11a, a follower-amplifier compartment 11b, and a final amplifier and connector compartment 11c. This receiver circuit includes a low capacitance, semiconductor detector 10, highly sensitive to low energy signals in the visible-near infrared range, having p-type material at its outer face with a grounded junction 10a thereon, and also having n-type material at its inner face with a junction 10b thereon. Detector 10 is contoured and biased from a high positive voltage source, not shown, through connector 19 and junction 10b, which source is sufficient to produce avalanche amplification in the detector, as more fully disclosed and claimed in U.S. Pat. 3,293,435. Huth. Generally, detector 10 has a capacitance of less than 50 picofarads and a bias voltage of 1400 to 1900 volts D-C. Junction 10b of detector 10 is also connected, through high voltage ceramic disc capacitor 20, to the negative junction of a tunnel diode 21, which is biased near its low voltage peak-point current in a monostable quiescent state, by back diode 25. Tunnel diode 21 has low junction capacitance and low peak-point current in the low voltage portion of its characteristic curve. The positive junction of tunnel diode 21 is grounded. Capacitors 20 and 30 isolate the biasing circuits of the detector 10 and the tunnel diode 21, respectively.

Inductors 23 and 24 impede the flow of rapid rise time pulses from detector 10 to connectors 19 and 22 respectively. Further, inductor 23, in combination with resistor 26, limit avalanched voltage variations, due to photo current produced by natural light incident on detector 10, in the detector bias circuit. A grounded back diode 25 provides a bleed-off circuit for slow rise time pulses from detector 10 which are shunted through inductor 24 and back diode 25 by resistances 26, 27, and 28. Back diode 25, which is biased in its low impedance ON state, by a low negative voltage source, not shown, connected to connector 22, also maintains a constant bias voltage on tunnel diode 21. The D-C bias load line of tunnel diode 21 is set by resistor 32.

Rapid rise time signals, detected and amplified by detector 10 and further amplified by the equally rapid operation of the tunnel diode in its negative resistance region, then pass to another high speed amplification means. In the circuit diagrammed in FIG. 2, this means is follower-amplifier transistor 29, which is a high speed, forward biased, digital mode transistor. Base and collector voltages in transistor 29 are set by resistors 33 and 34 and by a low positive voltage source, not shown, connected to connector 35. This biasing circuit for transistor 29 includes a filter means 36 to eliminate transients in the transistor bias. The output from follower-amplifier transistor 29, then goes to another high speed amplifying stage 37, which may comprise any conventional high speed amplification means, where the signal current is increased to match the impedance of an output transmitting coaxial cable connected to output connector 38.

In one operative embodiment of the circuit represented in FIG. 2, detector 10 is comprised of n-type silicon with its outer face doped p-type and the doped layer etched to reduce the drift-free zone thickness and to thereby enhance the sensitivity of the detector. This detector, with a capacitance of about 6 picofarads, is responsive to signals throughout the range from .45 to 1.1 microns. Its peak response is at about 0.6–1.1 microns. Bias voltage on the detector is about 1900 volts; on tunnel diode 21 bias circuit connector 22, about −6 to −10 volts; and on the transistor bias circuit, about +3 volts. Resistors 26, 27, and 28 have values of about 10,000, 330, and 470 ohms, respectively, while inductor 23 is about 22 microhenries and inductor 24, about 220 microhenries. Capacitor 20 and 30 are rated at 200–300 and 10,000 picofarads respectively. Tunnel diode 21, in this embodiment, is a germanium tunnel diode, having a junction capacitance of less than 1 picofarad, and a typical low voltage peak-point current of less than 2.2 milliamps. (Gallium arsenide, indium antimonide or other types of tunnel diodes having similar characteristics may also be used.) With a tunnel diode resistance value of 46 ohms, back diode 25 is biased to maintain a constant voltage of approximately 0.180 volts at the back diode junction.

Time delays caused by high series impedance and stray capacitance are minimized in the circuit shown in FIG. 2 by utilizing miniaturized, low inductance, low capacitance components housed in a compact enclosure. This is illustrated, for the detector compartment 11a specifically, in FIG. 3. There is shown in FIG. 3, the physical lay-out, in compartment 11a, of the contoured detector 10, capacitor 20, tunnel diode 21, detector biasing circuit inductor 23, tunnel diode biasing circuit inductor 24, and signal transmitting circuit resistance 28.

In the operation of the above circuit, a signal input to the contoured detector is subjected to avalanche amplification therein. Since the circuit, which includes inductor 24 and back diode 25, exhibits low impedance to ordinary slow rise time signals passing from contoured detector 10 through capacitor 20, such signals will preferentially pass through this circuit. Tunnel diode 21 and resistor 28, in the signal transmitting circuit, exhibit relatively higher impedance to the slow rise time signals. If the signal is one with a very rapidly changing magnitude, such as a rapid rise time pulse, however, inductors 23 and 24 act as relatively high impedance to this signal. Rapid rise time pulses therefore tend to pass to the relatively lower impedance of tunnel diode 21. Tunnel diode 21 responds to this signal extremely rapidly, amplifying it by means of its well-known negative resistance characteristic. The selectively amplified rapid rise time signal is then transmitted through the transmitting circuit resistance 28 to the transistor follower-amplifier 29, and then to the final amplifier 37 and signal output connector 38. Thus the coherent, short wavelength signals, with their rapid rise time are individually received and selectively amplified and transmitted.

Referring now to FIG. 4, another receiver circuit is shown. This circuit incorporates the same detector compartment circuitry for detection and selective amplification of rapid rise time signals used in the circuit shown in FIG. 2. However, tunnel diode 39 replaces transistor 29 as the secondary high speed amplification means or first follower-amplifier stage. When this is combined with the high speed response of conventional tunnel diode amplification in final amplifier 37, which may be considered a second follower-amplifier stage, response times on the order of 1 nanosecond can be achieved. This compares to typical response times on the order of 10 nanoseconds for the circuit shown in FIG. 2. For ranging purposes, accurate ranging at distances of less than 10 feet is possible with the circuit shown in FIG. 4.

Tunnel diode 39, in FIG. 4, is similar to tunnel diode 21 in FIG. 2, 3, and 4. Tunnel diode 39 is also biased in the same maner, although not as close to its peak voltage, as is tunnel diode 21. In this respect resistors 41 and 42 correspond in function to resistors 27 and 32, inductor 42 corresponds to inductor 24 and back diode 43 corresponds in function to back diode 25. Back diode 43 is also biased in the ON mode, producing a steady voltage to bias tunnel diode 39 in a monostable quiescent state.

In one operative embodiment of the circuit shown in FIG. 4, inductor 42 is rated at 47 microhenries. Resistors 32 and 27 have values of 47 ohms; resistor 27, 330 ohms; and resistor 40, 620 ohms. A capacitor 44, rated at 0.012 microfarads, and back diodes 45 and 46, biased in the OFF mode, to act as rectifiers, are included to isolate the various amplifier stages and to prevent backward flow of signal pulses.

If the receiver, in the above devices, is mounted to receive signals directly from the transmitter and the trigger pulse mechanism includes a pulse code modulator, intelligence may be conveyed from the transmitter at one location, to the receiver, which includes a pulse decoding means, at another location.

Generally speaking, it is the very high degree of sensitivity in the contoured detector that permits its use in conjunction with a low energy pulse signal generator and the selective, high speed amplification of these signals by a tunnel diode followed by further high speed amplification means, which renders the system disclosed herein feasible. It is the fact that these systems are based on digital, high speed response to very short pulses which renders these systems extremely accurate. Finally, it is the fact that the receiving part of these systems are selectively responsive only to very rapid rise time pulses and receptive to relatively low energy pulses of this type, that renders them free from interference or jamming from other forms of natural and artificial radiant energy incident upon the contoured detector. (With regard specifically to natural radiant energy sources, practically no natural occurrence produces a signal with a rise time sufficiently fast to trigger the receiver used in the present invention.)

It should be noted that systems utilizing the present invention have been incorporated in a device occupying less than 3 cubic inches.

Control, tracking, interception, point-to-point communication, and collision prevention in the automotive and aerospace fields are among the possible applications of the present invention.

While the present invention has been described with reference to particular embodiments thereof for purposes of clarity and convenience, it should be understood that numerous modifications may be made by those skilled in the art without departing from the invention's true spirit and scope. Therefore, the appended claims are intended to cover all such equivalent variations as come within the true spirit and scope of the present invention.

What we claim as new and desire to secure by Letters Patent of the United States is:

1. A signal sending and receiving system comprising, in cooperative arrangement,
   (I) means for transmitting a series of coherent signals in the visible-near infrared range, said signals having a rapid rise time of no greater than 200 nanoseconds to an energy level of no less than 1 watt, and
   (II) means for selectively receiving said signals, said receiving means including:
      (A) signal detecting means comprising an avalanche multiplying, contoured, semiconductor detector responsive to said signals in combination with
      (B) means for selectively bleeding off slow rise time pulses having rise times greater than 200 nanoseconds.
      (C) and a tunnel diode means for selective amplification of said rapid rise time signals.

2. A system as recited in claim 1, wherein said selective amplification means includes
   (I) a tunnel diode with its positive junction at ground potential and its negative junction connected to
      (a) a slow rise time pulse bleed-off and tunnel diode biasing system including means for maintaining a constant bias voltage at said tunnel diode and means for conducting pulses from said detector to ground and, interposed between said tunnel diode negative junction and said pulse grounding means, a circuit having relatively high impedance to fast rising pulses having rise times in the range of the rise times of the said rapid rise time signals and a relatively low impedance to slow rising pulses having relatively slower rise times and
      (b) an output circuit, which has a high impedance relative to said pulse-bleed-off and tunnel diode biasing system, connected to at least one successive follower-amplifier stage.

3. A system, as recited in claim 1, wherein said signal transmitting means comprises an injection lasing diode operable at room temperature.

4. A system, as recited in claim 1, wherein said signal transmitting means comprises an injection lasing diode having a gallium arsenide emitter element.

5. A system, as recited in claim 1, wherein said signals are in the range 0.6–1.1 microns and said semiconductor detector is comprised of silicon.

6. A system, as recited in claim 1, wherein said selective amplification means includes a slow rise time pulse bleed-off and tunnel biasing system comprised of a negative voltage source biasing a grounded back diode in the low impedance ON state to provide a circuit to ground for pulses originating in said semi-conductor detector and further to maintain a constant bias voltage at said tunnel diode and wherein said system also includes, interposed between said back diode and said tunnel diode negative junction, a circuit having relatively high impedance to fast rising pulses having rise times in the range of the rise times of said rapid rise time signals and a relatively low impedance to slow rising pulses having relatively slower rise times.

7. A system, as recited in claim 1, wherein said selective amplification means includes a follower-amplifier stage comprised of a forward biased, digital mode transistor.

8. A system, as recited in claim 1, wherein said selective amplification means includes a follower-amplifier stage comprised of a second tunnel diode biased, by a constant voltage inductive circuit, in a monostable quiescent state.

9. A system, as recited in claim 1, wherein said cooperative arrangement comprises a ranging device in which said receiving means is mounted to detect reflections of the pulsed signals from said signal transmitting means, said arrangement further including means for measuring the time delay from the time a signal is transmitted to the time it is received.

10. A system, as recited in claim 1, wherein said signal transmitting means includes a pulse code modulator and said signal receiving means includes a pulse de-coder and said transmitting and receiving means are disposed, at a distance from one another, such that signals may be transmitted directly from said transmitting means to said receiving means.

References Cited

UNITED STATES PATENTS

| | | | |
|---|---|---|---|
| 2,776,367 | 1/1957 | Lehovec | 250—199 |
| 2,970,310 | 1/1961 | Bruce | 250—199 |
| 3,200,259 | 8/1965 | Braunstein | 250—199 |
| 3,223,938 | 12/1965 | Brook | 250—199 |
| 3,227,882 | 1/1966 | Bissett | 250—199 |
| 3,267,294 | 8/1966 | Dumke | 250—199 |
| 3,319,080 | 5/1967 | Cornely. | |
| 3,379,888 | 4/1968 | Rossoff | 250—199 |

ROBERT L. GRIFFIN, Primary Examiner

A. J. MAYER, Assistant Examiner